United States Patent
Hansen et al.

(10) Patent No.: US 8,369,784 B2
(45) Date of Patent: *Feb. 5, 2013

(54) HIGH SPEED DATA TRANSMISSION UTILIZING A HIGH FREQUENCY PHYSICAL LAYER FOR A WIRELESS PERSONAL AREA NETWORK DEVICE

(75) Inventors: Christopher J. Hansen, Los Altos, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,490

(22) Filed: Apr. 25, 2012

(65) Prior Publication Data

US 2012/0224478 A1 Sep. 6, 2012

Related U.S. Application Data

(63) Continuation of application No. 12/889,115, filed on Sep. 23, 2010, now Pat. No. 8,195,092, which is a continuation of application No. 11/849,786, filed on Sep. 4, 2007, now Pat. No. 7,840,184.

(60) Provisional application No. 60/943,990, filed on Jun. 14, 2007.

(51) Int. Cl.
*H04B 7/00* (2006.01)
(52) U.S. Cl. ..................... 455/41.2; 455/41.3
(58) Field of Classification Search ............... 455/41.2, 455/41.3, 500, 513, 456.1; 370/464, 469
See application file for complete search history.

(56) References Cited

U.S. PATENT DOCUMENTS 7,594,010 B2 * 9/2009 Dohler et al. ............... 709/224
7,639,182 B2 * 12/2009 Schmidt et al. ............. 342/458
2011/0009063 A1 * 1/2011 Hansen et al. .............. 455/41.2

* cited by examiner

*Primary Examiner* — Eugene Yun
(74) *Attorney, Agent, or Firm* — Garlick & Markison; Kevin L. Smith

(57) ABSTRACT

Wireless devices may utilize a Bluetooth stack to setup a data transmission session with other devices. The data transmission session may include a Bluetooth physical layer or a medium access control/physical layer that permits wireless devices to perform discovery, pairing, and security setup operations. When a radio interface of a wireless device is insufficient to enable performing a required data communication, such as a high data rate communication, a data transmission session may be established with at least one medium access control/physical layer of a plurality of other medium access control/physical layers to accommodate the required data communication.

20 Claims, 4 Drawing Sheets

HIGH SPEED DATA TRANSMISSION UTILIZING A HIGH FREQUENCY PHYSICAL LAYER FOR A WIRELESS PERSONAL AREA NETWORK DEVICE

CROSS-REFERENCE TO RELATED APPLICATIONS

The present U.S. Utility Patent Application claims priority pursuant to 35 U.S.C. §120, as a continuation, to the following U.S. Utility Patent Application, which is hereby incorporated herein by reference in its entirety and made part of the present U.S. Utility Patent Application for all purposes:

1. U.S. Utility application Ser. No. 12/889,115, entitled "METHOD AND SYSTEM FOR UTILIZING A HIGH FREQUENCY PHY LAYER FOR HIGH SPEED DATA TRANSMISSION BETWEEN WIRELESS DEVICES," filed Sep. 23, 2010, now issued as U.S. Pat. No. 8,195,092, on Jun. 5, 2012, which claims priority pursuant to 35 U.S.C. §120, as a continuation, to the following U.S. Utility Patent Application which is hereby incorporated herein by reference in its entirety and made part of the present U.S. Utility Patent Application for all purposes:

2. U.S. patent application Ser. No. 11/849,786, entitled "METHOD AND SYSTEM FOR UTILIZING A 60 GHZ PHY LAYER FOR HIGH SPEED DATA TRANSMISSION BETWEEN BLUETOOTH DEVICES," filed Sep. 4, 2007, issued as U.S. Pat. No. 7,840,184, on Nov. 23, 2010, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/943,990, entitled "METHOD AND SYSTEM FOR AN ALTERNATE PHYSICAL INTERFACE TRANSCEIVER FOR BLUETOOTH," filed Jun. 14, 2007, expired.

TECHNICAL FIELD

Certain embodiments relate to data transmission in wireless devices. More specifically, certain embodiments relate to utilizing another physical layer for high speed data transmission between Bluetooth devices.

BACKGROUND

The field of wireless communication has seen dramatic growth the last few years. In today's world, most people use their wireless devices for various purposes, business and personal, on a constant and daily basis. Society is truly becoming a wireless one. A lot of wireless solutions have been introduced, and have made tremendous strides into everyday's life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

Many devices nowadays, including such devices as cellular phones, PDA's, and/or laptops, comprise wireless capabilities; including the Bluetooth protocol, which may be suitable for operations pertaining to interacting with other wireless devices that may be located within Bluetooth interface operational range. While wireless devices may have initially been intended solely for uses consistent with peer-to-peer communication, other applications and uses have appeared and/or gained popularity in recent years. These non-communicative operations may comprise audio/video applications such as still and moving picture recording application and voice recording applications. Though the Bluetooth interface may be suitable and/or optimal for communicative operations, its transmission data rates may prevent and/or limit the use of the Bluetooth interface for applications that may necessitate high transmission data rates, for example, video streaming.

Further limitations and disadvantages of conventional and traditional approaches will become apparent to one of skill in the art, through comparison of such systems with some aspects as set forth in the remainder of the present application with reference to the drawings.

DETAILED DESCRIPTION OF THE DRAWINGS

Certain embodiments may be found in a method and system for utilizing a 60 GHz PHY layer for high speed data transmission between Bluetooth devices. Wireless devices may be enabled to utilize a Bluetooth interface, and may utilize the Bluetooth interface for performing such operations as discovery, pairing, and/or security key initiation between such devices utilizing the Bluetooth interface. However, the Bluetooth protocol may not be optimal for high speed data transmissions. While the wireless device may utilize the Bluetooth legacy stack to form a Bluetooth PHY and/or MAC/PHY connection that enables performing such operations, a secondary physical layer may be utilized for dedicated high speed data transmission where necessary. The secondary physical layer may comprise a 60 GHz PHY and/or MAC/PHY layer that may be managed through the Bluetooth stack to enable applications running within the Wireless devices, a top of the Bluetooth stack, to use the high speed data transmission offered by such secondary physical layers transparently. The 60 GHz PHY and/or MAC/PHY layer may be managed by the Bluetooth stack via a protocol adaptation layer/host controller interface (PAL/HCI) layer that enables transparent use of the secondary physical layer. The Bluetooth connection may be utilized throughout the data transmission over the 60 GHz PHY and/or MAC/PHY to continually monitor and/or manage the data transmission. Additionally, a portion of the transmitted data may be multiplexed onto other secondary physical layers that may be available in the Wireless devices. For example, WLAN (IEEE 802.11) and/or Ultra Wideband (UWB) may be utilized along with the 60 GHz PHY and/or MAC/PHY to perform required high speed data transmission. The Bluetooth stack may enable switching between available secondary physical layers during the data transmission. Signaling performed over the Bluetooth PHY and/or MAC/PHY may be utilized in performing any such data multiplexing and/or switching.

Figure 1:
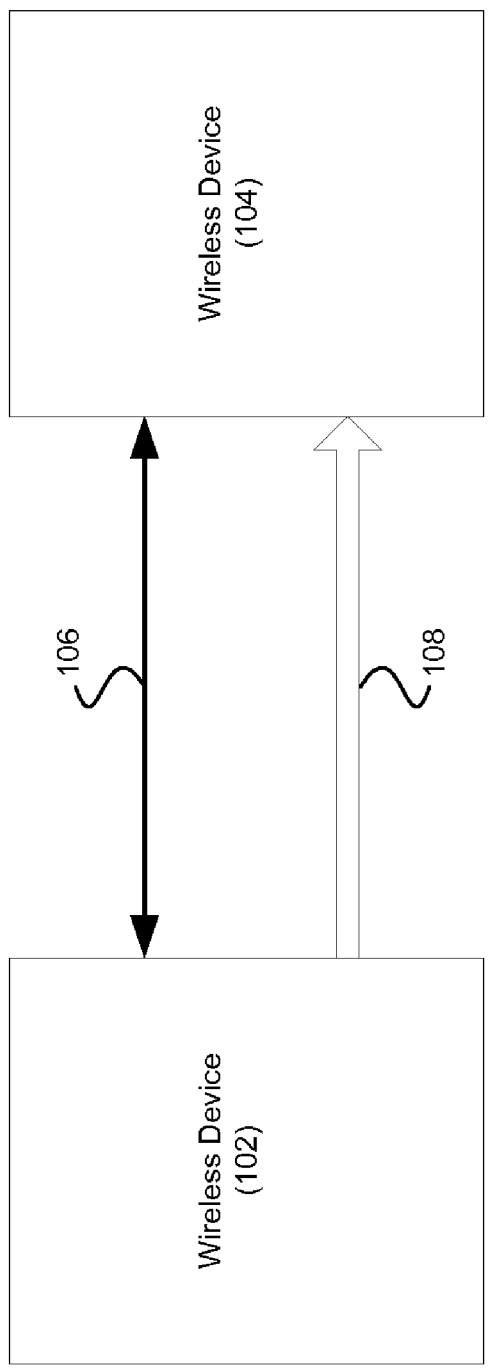
FIG. 1 is a block diagram illustrating two exemplary devices that transmit control signals over a Bluetooth connection and a high speed data signal over a secondary physical connection, in accordance with an embodiment of the invention.

FIG. 1 is a block diagram illustrating two exemplary devices that transmit control signals over a Bluetooth connection and a high speed data signal over a secondary physical connection. Referring to FIG. 1, there is shown wireless devices 102 and 104, Bluetooth connection 106, and high speed data connection 108.

The wireless device 102 may comprise suitable logic, circuitry and/or code that may enable performing wireless mobile communication utilizing Bluetooth protocol (IEEE 802.15) and other wireless protocols. For example, the wireless device 102 may enable data communication via WLAN (IEEE 802.11), Ultra Wideband (UWB), and/or 60 GHz interfaces. The wireless device 102 may also comprise suitable logic, circuitry and/or code that may enable performing additional functionality that may necessitate generation and/or transmission of large data files. For example, the wireless device 102 may enable generation and/or transmission of video streaming and/or audio recordings.

The wireless device 104 may comprise suitable logic, circuitry and/or code that may enable communications with the wireless device 102. The embodiment may not be limited to a specific device, but may comprise for example, a general purpose processing device, a specialized processing device, and/or a specialized peripheral device which may be enabled to perform various jobs and/or tasks that may be requested by the wireless device 102. The wireless device 104 may comprise a personal computer (PC), a high-definition television (HDTV) set, a printer/scanner/fax device, a dedicate memory storage device, and/or a digital video recorder device. For example, the wireless device 104 may comprise a home PC that may be more capable or suitable of performing processing and/or storage operations of large data files than the wireless device 102 due to more powerful processing subsystems and/or increased memory space compared to the wireless device 102. Such home PC may be better suited to perform processing and/or storage intensive tasks that otherwise would have to be performed in the wireless device 102. Similarly, a networked HDTV monitor may be more suitable for displaying high definition multimedia content rather than the wireless device 102.

The Bluetooth connection 106 may comprise a Bluetooth radio link between wireless devices 102 and 104. The high speed data connection 108 may comprise a radio and/or wireless link between the wireless devices 102 and 104 that is based on a wireless protocol that may comprise 60 GHz, UWB, and/or 802.11. Additionally, the Bluetooth connection 106 and/or high speed data connection may comprise the physical layers (PHY) and medium access control (MAC) layers functioning in wireless devices 102 and/or 104 to facilitate communication via the corresponding radio and/or wireless link. PHY layer correspond to the physical layer within the Open System Interface (OSI) model, which may enable transmitting raw bits via communication links. The MAC layer correspond to the medium access control sublayer of the Data Link layer within the OSI model; the MAC layer may enable controlling access to shared media networks, and may comprise addressing and/or channel control operations.

In operation, the wireless device 102 may need to perform high speed data transmission, for example, where large data files may have to be transmitted from the wireless device 102. Both wireless device 102 and 104 may be enabled to utilize Bluetooth protocol (IEEE 802.15). The Bluetooth protocol may enable efficient discovery, pairing, and initial setup functionality. The wireless device 102 may utilize discovery functionality of the Bluetooth protocol to discover local devices that may comprise Bluetooth interface. Once the wireless device 102 is enabled to discover the wireless device 104, the wireless devices 102 and 104 may utilize the Bluetooth protocol pairing functionality to establish the Bluetooth connection 106. The Bluetooth protocol, while it may be optimal for local discovery and/or pairing operations, may not be efficient and/or convenient for transfer of large data files because it may not enable large data bit rates.

The wireless device 102 may utilize the Bluetooth connection 106 to determine other wireless interfaces that the wireless device 104 may support. The wireless device 102 may then establish high speed data connection 108 utilizing one of the available wireless interfaces, which may enable transmission of data from wireless device 102 to the wireless device 104 at higher rates than available via the Bluetooth interface. For example, the wireless device 102 may determine that the wireless device 104 may support 60 GHz interface. The 60 GHz interface/protocol may enable high speed data transmission that may range from 2 to 10 Gbps (Gigabit per second). Consequently, the 60 GHz interface may be utilized to establish the high speed data connection 108. The Bluetooth connection 106 may be utilized during data transmission over the high speed transmission connection 108 to continually monitor and/or manage the data transmission.

Figure 2:
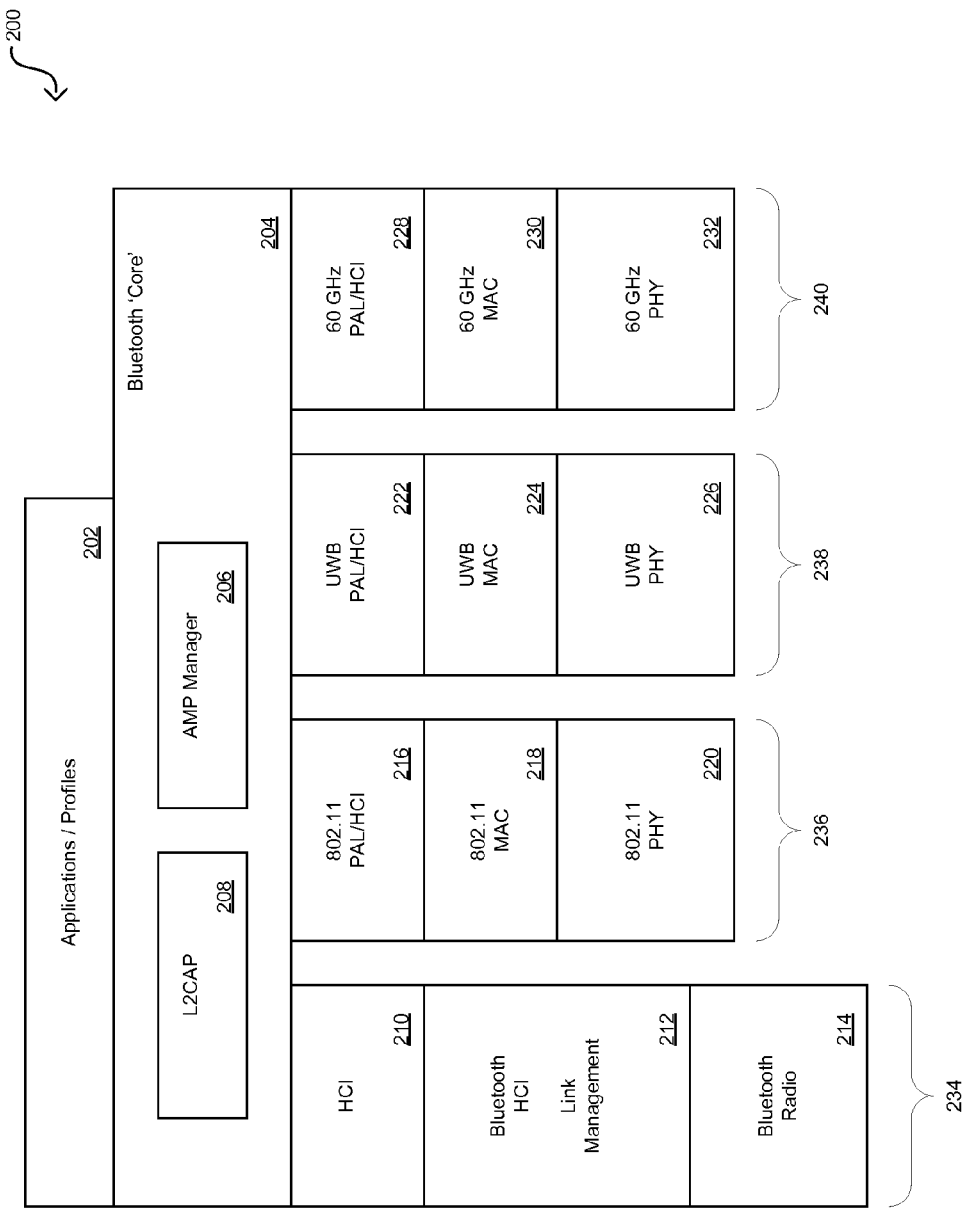
FIG. 2 is a block diagram illustrating a protocol stack diagram for Bluetooth that enables utilizing other physical layers for data transmissions, in accordance with an embodiment of the invention.

FIG. 2 is a block diagram illustrating a protocol stack diagram for Bluetooth that enables utilizing other physical layers for data transmissions. Referring to FIG. 2, there is shown a Bluetooth stack 200 that may comprise applications/profiles layer 202, and a Bluetooth core 204. The Bluetooth core 204 may comprise a Logical Link Control and Adaptation Protocol (L2CAP) 206, and an alternate MAC/PHY Manager (AMP) 208. There is also shown a Bluetooth interface 234, an 802.11 interface 236, an ultra-wide band (UWB) interface 238, and a 60 GHz interface 240. The Bluetooth interface 234 may comprise a Bluetooth HCI interface 210, an HCI link management block 212, and a Bluetooth radio block 214. The 802.11 interface 236 may comprise an 802.11 PAL/HCI block 216, an 802.11 MAC 218, and an 802.11 PHY 220. The ultra-wide band (UWB) interface 238 may comprise an UWB PAL/HCI block 222, an UWB MAC 224, and an UWB PHY 226, The 60 GHz interface 240 may comprise a 60 GHz PAL/HCI block 228, a 60 GHz MAC 230, and a 60 GHz PHY 232. The 802.11 interface 234, the ultra-wide band (UWB) interface 238, and the 60 GHz interface 240 may be referred to as alternate interfaces.

The Bluetooth core 204 may be a link layer interface for Bluetooth communications. The Bluetooth core 204 may enable utilizing the Bluetooth interface 234 in instances where the Bluetooth radio 214 may be utilizes to transmit and/or receive data. The AMP 208 may enable connecting alternative interfaces that may incorporate non-Bluetooth MAC/PHY below the Bluetooth core layer to operate the Bluetooth applications and profiles at the top. In instances where other MAC/PHY interfaces may be utilized, a protocol adaptation layer/host controller interface (PAL/HCI) layers for each of the MAC/PHY interfaces may be utilized to enable utilizing non-Bluetooth radio interfaces to communicate data corresponding to applications running within the applications/profiles layer 202.

In operation, the Bluetooth stack 200 may be enabled to setup a data transmission session that may utilize secondary physical layer for high speed data transmission. During a Bluetooth discovery operation, a Bluetooth capable device that may be located in the neighborhood of another Bluetooth capable device may be able to recognize the other device, and vice versa. During a pairing process in Bluetooth, two Bluetooth-capable devices may decide that they want to communicate with each other and they may establish a secure key and start sharing information with each other. The pairing process may be performed over legacy Bluetooth radio. For example, the wireless devices 102 and 104 may utilize the Bluetooth core 204, the Bluetooth HCI 210, the Bluetooth HCI link management layer 212, and the Bluetooth radio 214 in performing discovery and/or pairing operations.

During data transmissions, the wireless device 102 and/or 104 may determine the type of connection, data rate and latency required for acceptable completion of the data transmission. In instances where a Bluetooth interface may not sufficiently enable performing the required data transmission, a secondary physical layer that may be better suited for the data transmission may be utilized.

In an embodiment, the 60 GHz interface may be utilized to perform data transmission. An application running on top of the Bluetooth stack 200, within the applications/profiles layer 202 may send the transmitted data. Consequently, the Bluetooth core 204 may enable transmission of the data wherein use of secondary, non-Bluetooth, physical layers may be made transparent. For example, the AMP manager 206 may enable managing and/or controlling data transmission via the 60 GHz interface. Within the 60 GHz PAL/HCI layer 228, the HCI functionality may be enabled to power the PAL functionality, and one or more data frames or packets that are output from the L2CAP layer 208 may be aggregated into large frames to fit into the 60 GHz MAC layer. The PAL layer may be enabled to aggregate frames received from the L2CAP layer. The PAL layer may be enabled to present an assessment of the channel quality to the AMP manager 206.

In another embodiment, there may be simultaneous connections over one or more MAC/PHY layers with one application running over Bluetooth enabling simultaneous utilization of multiple secondary physical layers. Transmitted data may be multiplexed over multiple connections to increase the quality of service. For example, the Bluetooth stack 200 may enable simultaneous use of the WLAN (IEEE 802.11), UWB, and 60 GHz interfaces. The 60 GHz interface 240 may be faster but it may be subject to dropouts or line of sight (LOS) interference problems. If there is a dropout on 60 GHz interface, the connection may not be lost completely because lower rate frames may be sent over the WLAN or the UWB connections. During a pairing process in Bluetooth, there may be a mapping of slots between two Bluetooth devices. The Bluetooth device attempting to transmit data may setup a link with a first Bluetooth device via the 60 GHz interface 240 while communicating with another Bluetooth device at a lower rate via another alternate interface such as the 802.11 interface 236 and/or the UWB interface 238.

Where simultaneous connectivity over available secondary physical layers, the Bluetooth stack 200 may enable switching among available secondary physical layers during a data transmission session to ensure completion of the data transmission. For example, where issues may arise during data transmission over the 60 GHz interface, the Bluetooth stack 200 may enable switching to the WLAN (802.11) interface to ensure continuing the data transmission.

Figure 3:
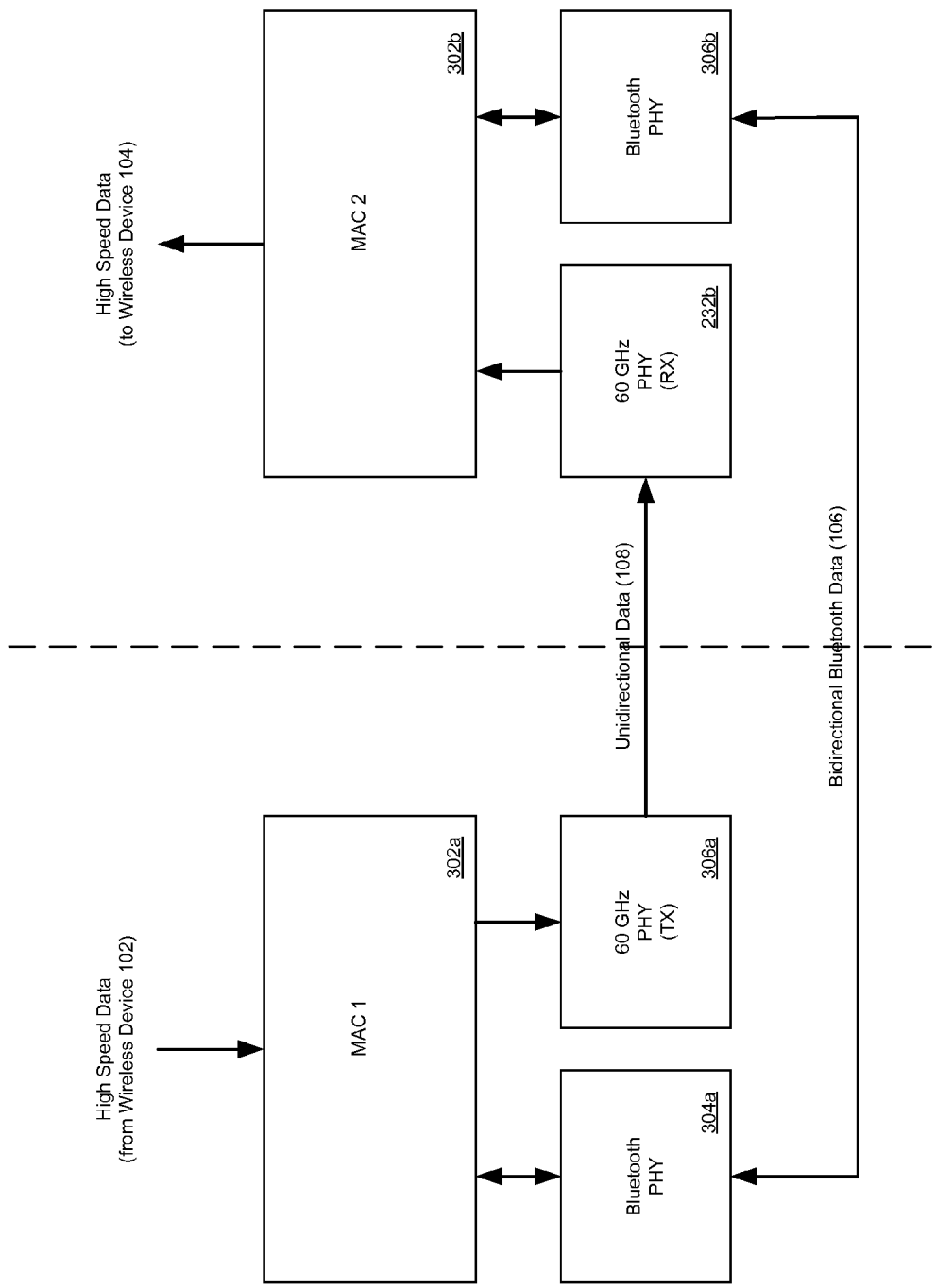
FIG. 3 is a block diagram illustrating a single medium access control (MAC) address and two physical layers, Bluetooth and 60 GHz, used by each of two wireless devices to facilitate transmission of high speed data, in accordance with an embodiment of the invention.

FIG. 3 is a block diagram illustrating a single medium access control (MAC) address and two physical layers, Bluetooth and 60 GHz, used by each of two wireless devices to facilitate transmission of high speed data. Referring to FIG. 3, there is shown the wireless devices 102 and 104 communicating data via data transmission session.

Device 102 utilizes a MAC layer 302a and two physical layers, a Bluetooth PHY 304a and a 60 GHz PHY layer 306a. The Bluetooth PHY layer 304a may be comprised substantially similar to the Bluetooth PHY layer 214 as described in FIG. 2, and may enable data transmission based on Bluetooth protocol. The 60 GHz PHY 306a may be substantially similar to the 60 GHz PHY layer as described in FIG. 2, and may enable high speed data transmission at a bandwidth centered at approximately 60 GHz. Device 104 utilizes a MAC layer 302b and two physical layers, a Bluetooth PHY 304b and a 60 GHz PHY layer 306b. The Bluetooth PHY layer 304b may be comprised substantially similar to the Bluetooth PHY layer 214 as described in FIG. 2, and may enable data transmission based on Bluetooth protocol. The 60 GHz PHY 306b may be substantially similar to the 60 GHz PHY layer as described in FIG. 2, and may enable high speed data transmission at a bandwidth centered at approximately 60 GHz.

The 60 GHz PHY layers 306a and 306b may be configured for transmission in only one direction as a means for providing uninterrupted unidirectional data transmission from one device to the other. However, the Bluetooth physical layers 304a and 304b may be used for providing one or more bidirectional control signals between the two devices. The bidirectional control signals may carry device management data such as configuration, timing, and/or control data. The one or more control signals may facilitate authentication and association of devices, assignment of a communication channel for transmitting high speed data between the two devices, and may also facilitate antenna training and setup for the two devices. The communication channel may be implemented using the second physical layers 306a and 306b provided in the two devices. The communication channel may be used to carry the high speed data that is transmitted unidirectionally from the first device to the second device. The second physical layer 232 may transmit the high speed data using a frequency division multiple access (FDMA) or a time division multiple access (TDMA) protocol. In a representative embodiment, the high speed data may be transmitted at rates of up to approximately 10 Gbps.

In operation, the device 102 may be required to transmit data at high rates, which may not be suitably handled using Bluetooth. The device 102 may utilize Bluetooth protocol, via MAC layer 302a and Bluetooth PHY 304a to perform Bluetooth discovery operations. Consequently, the device 102 may discover the device 104 and may determine it to be a suitable target of the requested data transmission. The devices 102 and 104 may utilize their respective MAC layers 302a and 302b, and the Bluetooth PHY layers 304a and 304b to establish the Bluetooth connection 106, which may enable performing connection setup operations that may comprise pairing and/or security key initialization. The device 102 and 104 may then setup a high speed data connection 108 via their respective MAC layers 302a and 302b, and the 60 GHz PHY layers 306a and 306b. Once the high speed data connection 108 is established, the device 102 may transmit high speed data to the device 104 over the high speed data connection 108. The transmission of the high speed data may comprise use of the MAC layers 302a and 302b, and the 60 GHz PHY layers 306a and 306b.

In another embodiment, the Bluetooth connection may be utilized during the data transmission over the high speed data connection 108 to continually monitor and/or manage the data transmission. The device 102 and 104 may exchange necessary control messages over the Bluetooth connection during the transmission of data over the high speed data connection 108.

Figure 4:
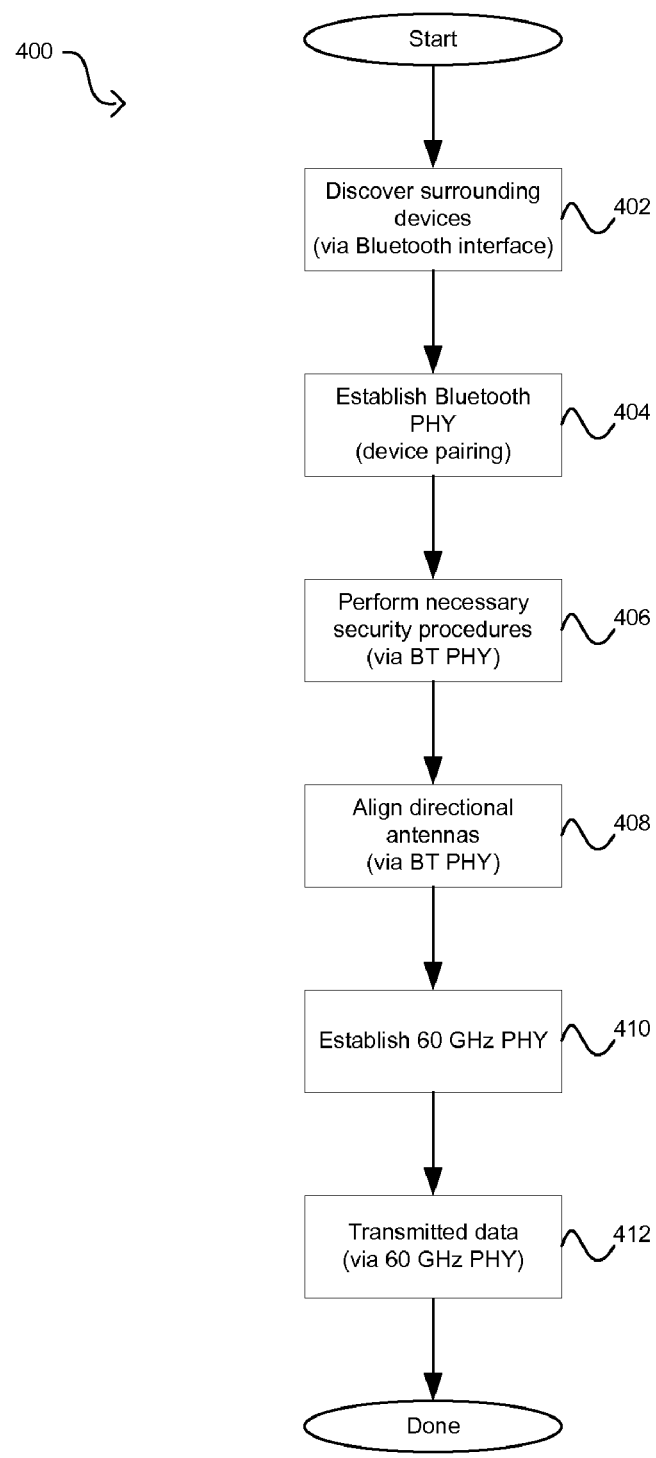
FIG. 4 is an exemplary flow diagram illustrating use of Bluetooth and 60 GHz physical layers to facilitate transmission of high speed data between Bluetooth-enabled devices, in accordance with an embodiment of the invention.

FIG. 4 is an exemplary flow diagram illustrating use of Bluetooth and 60 GHz physical layers to facilitate transmission of high speed data between Bluetooth-enabled devices. Referring to FIG. 4, there is shown a flow chart 400 comprising a plurality of exemplary steps. In step 402 a wireless device may utilize the Bluetooth protocol to perform discovery operations wherein other wireless devices within operational proximity of Bluetooth interface may be detected and/or contacted. For example, the wireless device 102 may utilize a legacy Bluetooth stack comprising the Bluetooth core 204, the Bluetooth HCI 210, the Bluetooth HCI Link management layer 212, and the Bluetooth radio to perform such discovery operations. In step 404, a Bluetooth PHY may be established. For example, the wireless device 102, having discovered the wireless device 104 in step 402, may establish the Bluetooth connection 106 utilizing the Bluetooth legacy stack 200 and/or Bluetooth PHY layers in both devices, substantially as described in FIG. 3.

In step 406, necessary security operations may be performed. For example, the Bluetooth connection 106 may be utilized to setup and/or exchange security keys that may be utilized to encrypt and/or decrypt data transmitted between the wireless devices 102 and 104. In step 408, a directional antenna may be aligned. While Bluetooth communication may be performed utilizing an Omni-directional antenna, high speed data transmission may be performed via a directional antenna that may enable efficient and/or optimal communication because less power may be utilized to guaranteed reception of data at target end. The Bluetooth connection 106 may be utilized to perform the directional antenna alignment. The wireless devices 102 and 104 may utilize the Bluetooth connection 106 to exchange necessary signaling messages that may ensure coordinating the alignment of their respective directional antennas.

In step 410, the 60 GHz secondary physical layer may be established. For example, the wireless device 102 may utilize the Bluetooth stack 200 to establish a 60 GHz connection with the wireless device 104 via the 60 GHz MAC layer 230 and the 60 GHz PHY layer 232. In step 412, a high speed transmission may be performed via the 60 GHz physical layer established in step 410.

In another embodiment, at least a portion of the transmitted data may be multiplexed onto other secondary physical layers that may be established between the wireless devices 102 and 104. For example, a portion of the data transmitted may be multiplexed onto WLAN MAC/PHY layers 218 and 220 and/or the UWB MAC/PHY layers 224 and 226. Alternatively, the wireless devices 102 and 104 may switch among available secondary physical layers in the course of the high speed data transmission. The Bluetooth connection 106 may be utilized throughout the high speed data transmission to continually monitor and/or manage the data transmission.

Various embodiments may include a method and system for utilizing a 60 GHz PHY layer for high speed data transmission between Bluetooth devices. Wireless devices 102 and 104 may be enabled to utilize the Bluetooth stack 200. The Bluetooth stack 200 may be utilized for performing such operations as discovery, pairing, and/or security key initiation between the wireless devices 102 and 104 utilizing a Bluetooth interface. The wireless devices 102 and 104 may form a Bluetooth connection 106 utilizing MAC layers 302a and 302b, and Bluetooth PHY layers 304a and 304b in order to enable performing the discovery, pairing, and/or key security initiation operations. In certain instances, the Bluetooth protocol may not be optimal for handling high speed data transmissions. In this regard, the wireless devices 102 and 104 may utilize the Bluetooth connection 106 for basic connectivity operations, while the high speed data connection 108, comprising a secondary physical layer, may be more suitable for dedicated high speed data transmission. The secondary physical layer may comprise 60 GHz PHY and/or MAC/PHY layers that may be managed through the Bluetooth stack 200 to enable applications running within the wireless devices 102 and 104 to use the high speed data transmission offered by such secondary physical layers transparently. The 60 GHz PHY and/or MAC/PHY layer may be managed by the Bluetooth stack 200 via AMP manager 206 and 60 GHz PAL/HCI layer 228 that may enable transparent use of the secondary physical layer. The Bluetooth connection 106 may be utilized throughout the data transmission over the 60 GHz PHY and/or MAC/PHY to continually monitor and/or manage the data transmission. Additionally, a portion of the transmitted data may be multiplexed onto other secondary physical layers that may be available in the Wireless devices. For example, WLAN (IEEE 802.11) and/or Ultra Wideband (UWB) may be utilized along with the 60 GHz PHY and/or MAC/PHY to perform required high speed data transmission. Alternatively, the Bluetooth stack may enable switching between all available secondary physical layers during the data transmission. Signaling performed over the Bluetooth PHY and/or MAC/PHY may be utilized in performing any such data multiplexing and/or switching.

Another embodiment may provide a machine-readable storage, having stored thereon, a computer program having at least one code section executable by a machine, thereby causing the machine to perform the steps as described herein for utilizing a 60 GHz PHY layer for high speed data transmission between Bluetooth devices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (that is, where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal.

As may also be used herein, the terms "processor", "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processor, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, et cetera, that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method of increased data transmission rates in a wireless personal area network (WPAN) device, the method comprising:

accessing a communication stack configured to manage a corresponding radio interface via a corresponding physical layer (PHY) layer for a required data communication; and when the corresponding radio interface is insufficient to enable performing a required data communication, configuring a data transmission session with at least one medium access control (MAC)/PHY layer of a plurality of other MAC/PHY layers to accommodate the required data communication, wherein the data transmission session is configured to communicate data via the at least one MAC/PHY layer utilizing the communication stack.

2. The method of claim 1, further comprising:
performing via the corresponding PHY layer a configuration function configuring a setup of the data transmission session, wherein the configuration function includes at least one of pairing, discovery, and securing of the data transmission session.

3. The method of claim 1, further comprising:
multiplexing at least a portion of the communicated data onto the at least one MAC/PHY layer of the plurality of other MAC/PHY layers.

4. The method of claim 1, further comprising:
switching among one or more of a corresponding plurality of other radio interfaces during the data transmission session.

5. The method of claim 1, wherein the communicating of the data via the at least one MAC/PHY layer occurs transparently.

6. The method of claim 1, further comprising:
determining when the corresponding radio interface is insufficient to enable performing the required data communication based on at least one of a type of connection, a data rate, and a required latency.

7. A wireless personal area network device having increased data transmission rate, the device comprising:
processor that includes a communication stack configured to manage a corresponding radio interface accessed by a corresponding physical (PHY) layer, wherein the communication stack is also operable to utilize a plurality of other medium access control (MAC)/PHY layers for accessing a corresponding plurality of other radio interfaces, the processor operable to:
when the corresponding radio interface is insufficient to enable performing a required data communication, configuring a data transmission session with at least one MAC/PHY layer of a plurality of other MAC/PHY layers to accommodate the required data communication, wherein the data transmission session is configured to communicate data via the at least one MAC/PHY layer utilizing the communication stack.

8. The wireless personal area network device of claim 7, wherein the plurality of other MAC/PHY layers are configured to access a corresponding plurality of other radio interfaces.

9. The wireless personal area network device of claim 7, wherein the processor is further operable to:
perform via the corresponding PHY layer one or more configuration functions during setup of the data transmission session, wherein the one or more configuration functions include at least one of pairing, discovery, and securing of the data transmission session.

10. The wireless personal area network device of claim 9, wherein the securing of the data transmission session includes security key establishment.

11. The wireless personal area network device of claim 7, wherein the processor is further operable to:
multiplex at least a portion of the data onto the at least one MAC/PHY layer of the plurality of other MAC/PHY layers.

12. The wireless personal area network device of claim 7, wherein the processor is further operable to:
switch among one or more of the corresponding plurality of other radio interfaces during the transmission data session.

13. The wireless personal area network device of claim 7, wherein the communication of the communicating the data between the wireless personal area network device and another wireless device via one or more of the corresponding plurality of other radio interfaces MAC/PHY layers occurs transparently.

14. The wireless personal area network device of claim 7, wherein the processor is further operable to:
dynamically manage the data transmission session between the wireless personal area network device and another wireless device via the corresponding PHY layer.

15. The wireless personal area network device of claim 7, wherein the processor is further operable to:
determine when the corresponding radio interface is insufficient to enable performing the required data communication based on a type of connection, a data rate, and/or a required latency.

16. A method of increased data transmission rates in a wireless personal area network (WPAN) device, the method comprising:
accessing a communication stack configured to manage a corresponding radio interface via a corresponding physical layer (PHY) layer for a required data communication, the communication stack is configured to utilize a plurality of other medium access control (MAC)/PHY layers for accessing a corresponding plurality of other radio interfaces; and
when the corresponding radio interface is insufficient to enable performing the required data communication, configuring a data transmission session with at least one medium access control (MAC)/PHY layer of a plurality of other MAC/PHY layers to accommodate the required data communication, wherein the data transmission session is configured to communicate data via the at least one MAC/PHY layer utilizing the communication stack.

17. The method of claim 16, further comprising
multiplexing at least a portion of the communicated data onto the one or more of the plurality of other MAC/PHY layers.

18. The method of claim 16, further comprising:
switching among the one or more of the corresponding plurality of other radio interfaces during the data transmission session.

19. The method of claim 16, wherein the communicating of the data via the one or more of the corresponding plurality of other MAC/PHY layers occurs transparently.

20. The method of claim 16, further comprising:
determining when the corresponding radio interface is insufficient to enable performing the required data communication based on at least one of a type of connection, a data rate, and a required latency.

* * * * *